UNITED STATES PATENT OFFICE.

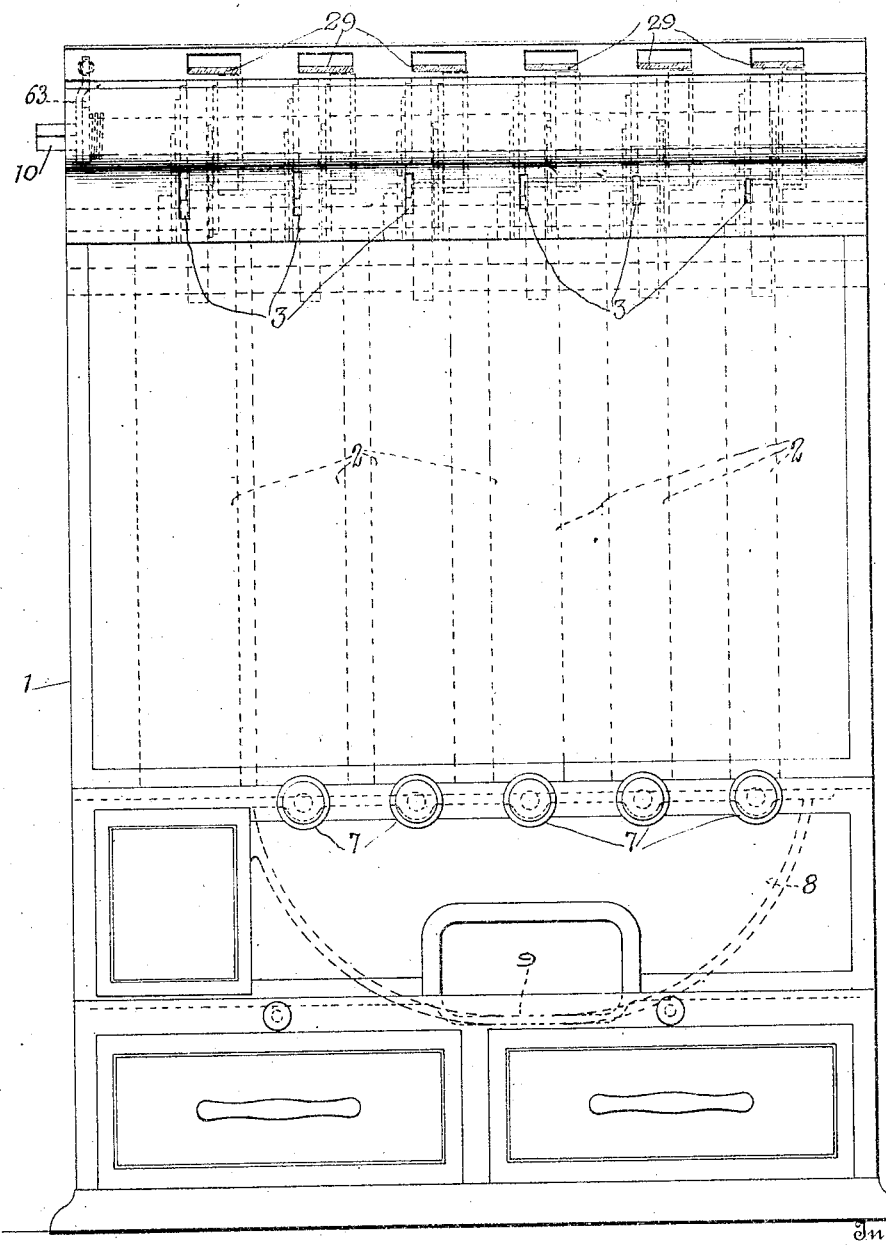

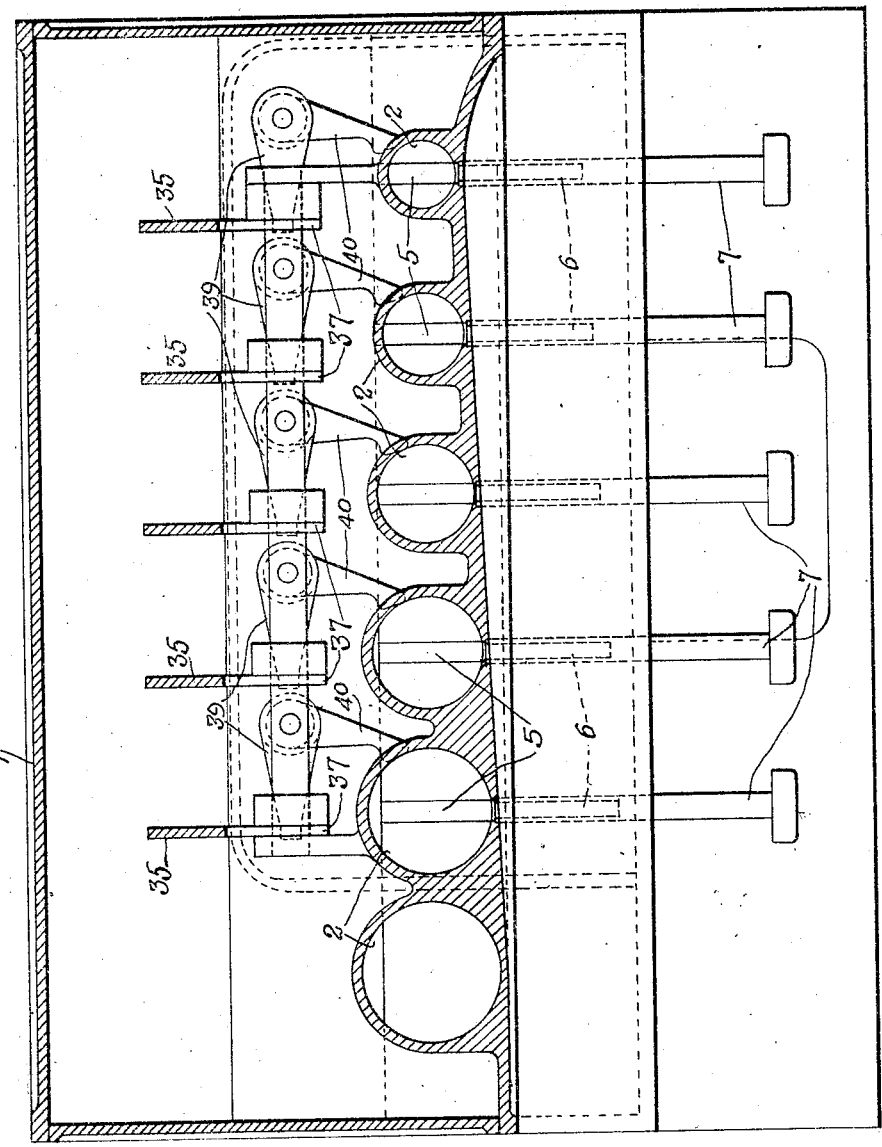

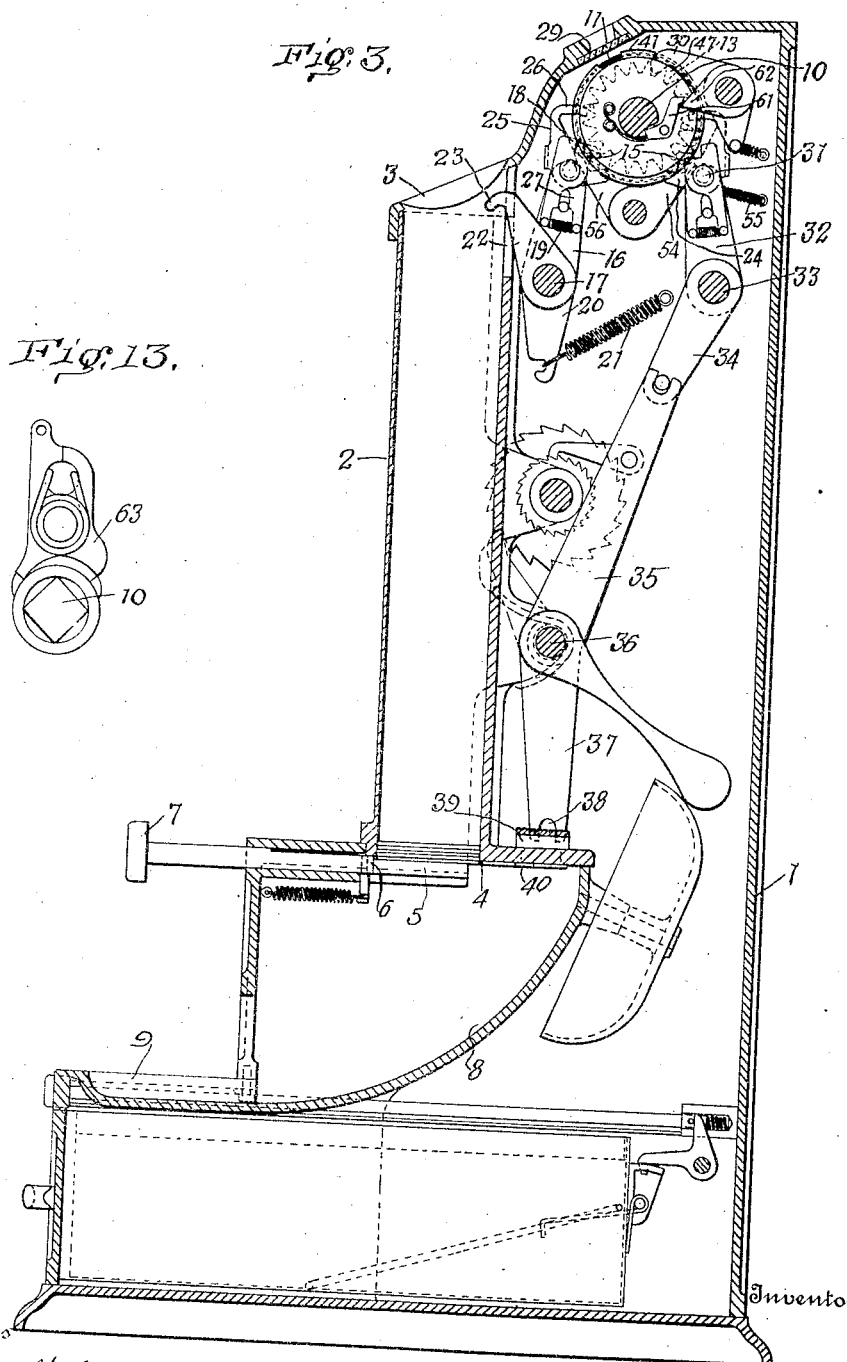

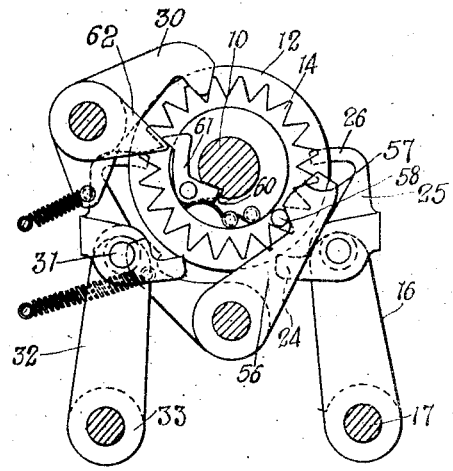
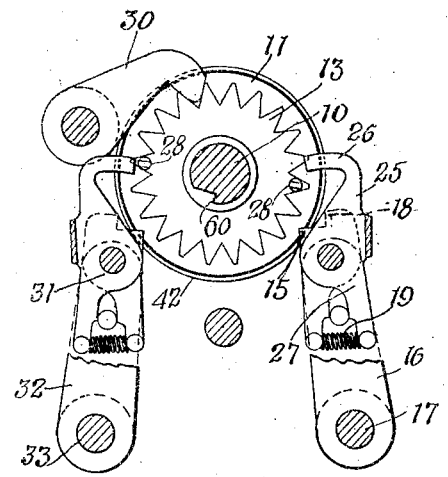
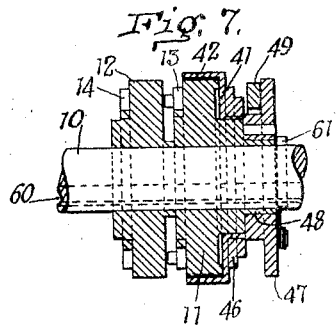
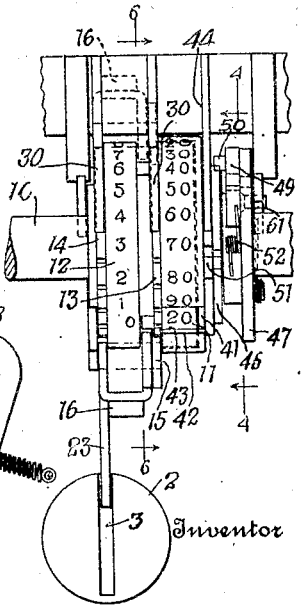

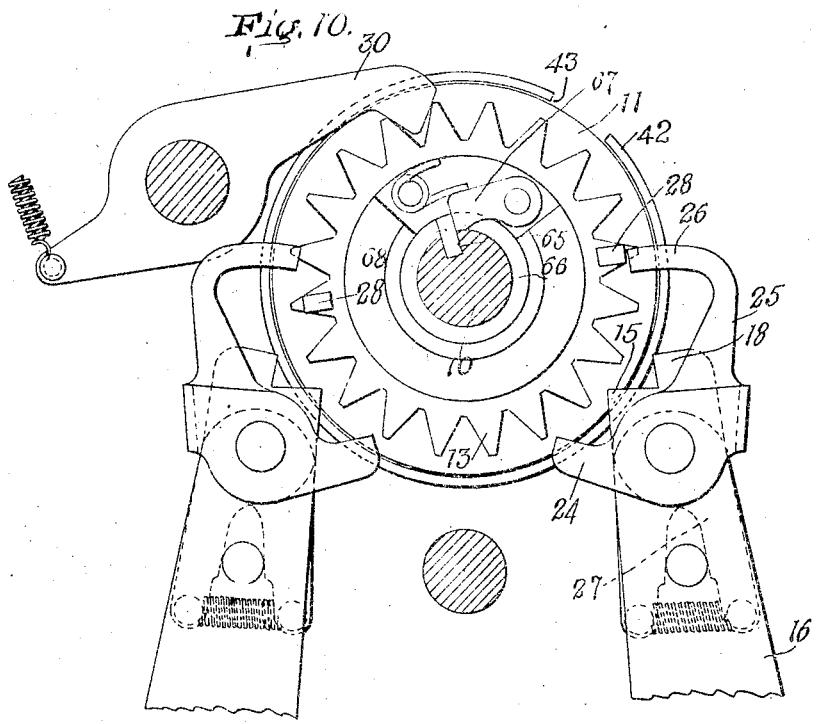
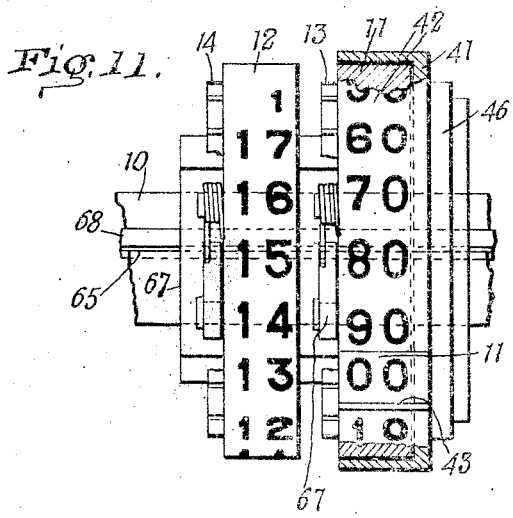
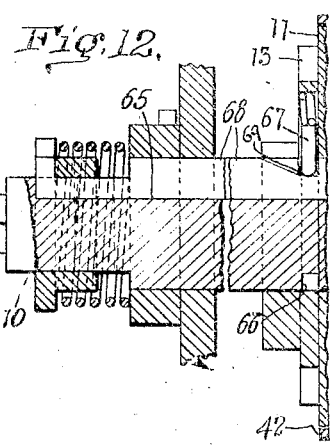

CHARLES WM. RIPSCH, OF DAYTON, OHIO, ASSIGNOR, BY MESNE ASSIGNMENTS, TO MAURICE FLATOW, OF CINCINNATI, OHIO, AND JOSEPH BRINKMANN, OF READING, OHIO.

COMPUTING DEVICE.

1,183,671. Specification of Letters Patent. Patented May 16, 1916.

Application filed June 13, 1914. Serial No. 844,841.

*To all whom it may concern:*

Be it known that I, CHARLES W. RIPSCH, a citizen of the United States, residing at Dayton, in the county of Montgomery and State of Ohio, have invented certain new and useful Improvements in Computing Devices, of which the following is a specification, reference being had therein to the accompanying drawing.

This invention relates to computing devices. The present device is designed more particularly for use in connection with a mechanism forming part of a credit system in which checks of the denomination, size and shape of the several coins are sold to customers and are then received in lieu of money. It will be understood, however, that the use of the device is not limited to such a system and that it is equally operable with the coins themselves. This mechanism comprises a series of coin receptacles, one for each denomination of coin, and the coins are deposited in the receptacles when they are received and withdrawn for the purpose of making change or otherwise. The number of coins deposited in the several receptacles during a given period, such as a day, and remaining therein at the end of that period, indicate the amount of business done during such period. Inasmuch as the coins or checks are not removed from the receptacles at the end of a day's business there will usually be a number of coins in one or more of the receptacles at the beginning of the next day's business. Consequently, a count of the coins in the receptacle at the end of the period will not indicate the actual business done.

The object of the invention is to provide a mechanism which will accurately compute the value of the coins received and retained during a given period, adding to the count the value of each coin deposited therein and subtracting therefrom the value of each coin removed. In the use of the mechanism the counters are all reset to zero at the end of each day's business and the coins or checks allowed to remain in the receptacles. It not infrequently happens therefore that on the following day it will be necessary to withdraw from the receptacle a greater number of coins than have been registered on the counter for that receptacle.

It is a further object of the invention to provide means forming a part of the computing mechanism which will compute the subtractions below zero and will indicate that the registration is below zero or is a "minus" registration.

It is also an object of the invention to provide means for resetting the mechanism to zero; and further to provide a device of this kind which will be of a simple character and can be built at a cost sufficiently low to enable a series of them to be embodied in the complete mechanism at a cost which will not be prohibitive.

In the accompanying drawings, Figure 1 is a front elevation of a mechanism having a series of computing devices embodying my invention; Fig. 2 is a horizontal section showing such a mechanism in plan; Fig. 3 is a vertical, sectional view of such a mechanism, showing in elevation one of the units comprising the same; Fig. 4 is a side elevation of one of the counters showing the actuating devices therefor; Fig. 5 is a sectional view taken on the line 6 6 of Fig. 6 and looking in the direction of the arrows; Fig. 6 is a front elevation of the counter; Fig. 7 is a longitudinal, sectional view taken vertically of the counter shown in Fig. 6; Figs. 8 and 9 are sectional views taken on the line 4 4 of Fig. 6, looking in the direction of the arrows and showing the parts in different positions; Fig. 10 is a detail sectional view of the counting mechanism showing a modified form of resetting device; Fig. 11 is a longitudinal sectional view of a counter showing a modified form of resetting device; Fig. 12 is a longitudinal sectional view of the counter showing said modified form of resetting device; and Fig. 13 is a detail of the stop for the resetting shaft.

In these drawings I have illustrated one embodiment of my invention and have shown the same as embodied in a registering mechanism consisting of a cabinet 1 in which are mounted a series of units, one for each coin to be handled, and each unit embodying my invention. It is, therefore, only necessary to an understanding of the invention that one of these units should be described in detail.

As shown best in Fig. 3, each unit comprises a coin receptacle 2 which is here shown in the form of a vertical tube of a diameter adapted to accommodate the coins of the particular denomination which the particular unit is to handle and to arrange those coins in a vertical tier. The particular unit which is here shown and described in detail is designed to handle ten cent coins and it will be understood that the units which handle coins of other denominations are modified only to such an extent as to cause them to compute the different values upon each operation thereof. The tubular coin receptacle is provided at its upper end with a closure having a slot, as shown at 3, through which the coin is deposited in the receptacle. The receptacle is provided at its lower end with a lateral opening at one side thereof, as shown at 4, and the bottom is slotted at 5 to receive the edge of a plunger 6 which is slidably mounted in the casing 1 and provided at its outer end with a head or push button 7. When the plunger is pushed inward its edge will engage the lowermost coin in the receptacle and will force this coin through the opening 4, thereby allowing it to drop onto a chute 8 which conveys the same to a tray 9 on the exterior of the casing where it is readily accessible.

Registering mechanism is provided for computing the value of the coins in the receptacle or the value of such part of those coins as have been placed in the receptacle during a given period of time, as during a single day. When the device is used in the manner above explained the computation may not be the value of all the coins in the receptacle but only the computation of the transactions for the day and the total computations of the several units represent the total of the day's business. The actuating means for the computing device are positively controlled by the coins themselves as they are deposited in or withdrawn from the receptacle, thus making it impossible to effect a false computation.

In that particular form of the device here illustrated I have shown the counter as comprising two counter wheels which are rotatably mounted on a supporting shaft 10. One of these counter wheels, which is indicated at 11, is a tens counter wheel, the units counter wheel being omitted because this device is adapted for dimes and registers in tens only and each operation of the initial counter wheel adds or subtracts ten to or from the record. A second counter wheel, which is indicated at 12, is the hundreds or dollars wheel and is moved one point, either to add or subtract, when the tens wheel 11 has been moved ten points in either direction. In the present instance the counter wheels are twenty point wheels, that is, they are provided on their peripheries with twenty numerals and for that reason the tens wheel 11 has duplicate sets of numerals, each set including the numerals "0" to "90" in multiples of ten. The dollar wheel 12 contains the numerals "0" to "17" and two blank spaces to provide for subtraction, as will be hereinafter explained.

Secured to the two counter wheels are star wheels 13 and 14 by means of which step by step rotary movement is imparted thereto. An actuating device is provided for engaging the star wheels and imparting movement thereto and this device is controlled by the coins which are passed through the slot 3 in the coin receptacle 2. It will be understood that this actuating device may be of any suitable construction and that the driving members, here shown as star wheels, may be of any construction adapted to coöperate with the particular actuating device employed. As here shown this device comprises a pawl or dog 15 pivotally mounted on an arm 16 carried by a shaft 17 and adapted to have rocking movement toward and away from the star wheel 13. When moved toward the star wheel the nose of the dog will engage a tooth of the star wheel and cause same to be advanced a distance sufficient to move the counter wheel 1 one point. The dog is provided with a second projection or nose 18 which, as the dog advances the star wheel is moved into the path of the succeeding tooth of the star wheel and serves to positively limit the movement of the counter wheel and prevent its overthrow. The pivotal movement of the dog permits the same to ride over the succeeding tooth of the star wheel after the latter has been advanced, and to return it to its normal position without imparting backward movement to the star wheel. A spring 19 holds the dog normally in its operative position. An arm 20 is rigidly secured to the arm 16 and projects beneath the shaft 17 where it is acted upon by a spring 21 to hold the arm 16 normally in its retracted position. A second arm 22 is also connected with the arm 16 and has an end portion or nose 23 projecting into the receptacle 2 adjacent to the slot 3. The arrangement of this nose is such that when a coin of the proper denomination, in the present instance, a dime, is inserted in the receptacle, the arm 22 will necessarily be actuated, thus causing the arm 16 to be rocked about its axis and the dog to operatively engage its star wheel, thereby advancing the tens counter wheel one point. In order to advance the hundreds counter wheel 12, to add thereto the accumulated count on the tens counter wheel, I have provided a second dog 24 which is pivotally mounted on the arm 16 on an axis coincident with the axis of the dog 15 and is held normally out of the path of the teeth of the star wheel 14 so that the normal operation of the arm 16 does not bring the dog 24 into engagement with its star wheel. Pivotally mounted on the arm 16 adjacent to the dog 15 is a trip arm 25 rigidly connected with the dog 24 and having a finger 26 arranged to be moved inward alongside the star wheel 13 upon each operation of the dog 15. The arm 25 also has a depending finger 27 connected with the spring 19, which spring serves to hold the arm 25 in its forward position but permits the same to yield. Mounted upon the star wheel 13 are two stops or pins 28 so arranged that when one of the "nine" indications on the tens counter wheel is brought into indicating position, that is, into alinement with the sight opening, which is shown at 29 in Fig. 1, one of the pins 28 will lie in the path of the finger 26 of the trip arm 25. Consequently, when the arm 16 and dog 15 are moved inward the finger 26 will engage the pin, rock the arm 25 and the dog 24 about their axes and move the latter into such a position that the further movement of the arm 16 will cause it to engage the adjacent tooth of the star wheel 14 and advance that star wheel one point, thus adding one unit to the hundreds counter wheel. The pins 28 are very thin, and, consequently, when the tens counter is moved into its "90" position and the pin strikes the top of the finger, the finger will check the movement of the star wheel before this movement is quite completed. But upon the withdrawal of the finger the spring actuated detent and alining pawl, which is shown at 30, will complete the movement of the star wheel and counter wheel. Thus it will be seen that the value of each coin deposited in the receptacle will be added to the counter.

In order to subtract from the amount registered on the counter the value of each coin removed suitable devices are provided which are actuated by the coin that is being withdrawn from the receptacle to impart a backward movement to the counter. In the present instance I have duplicated the actuating devices, just described, in the rear of the counter where they are so arranged that their operation will cause the star wheels and counter wheels, when actuated thereby, to move in a reverse direction. These actuating devices for subtraction are shown as a whole at 31 and are carried by an arm 32 mounted upon a shaft 33 and having connected therewith an arm 34 which is loosely connected with a second arm 35 carried by a shaft 36 and having connected therewith an arm 37, the lower end of which is slotted, as shown at 38, to receive the end of an arm 39 pivotally mounted on a vertical axis, as best shown in Fig. 2. This last mentioned arm has connected therewith a finger 40 which extends into the discharge opening 4 of the receptacle and will be engaged and actuated by any coin of the proper size which passes through that opening, thereby acting through the train of arms or levers to impart rocking movement to the actuating mechanism 31 to subtract the value of the coin from the amount registered on the counter.

It is desirable that some means should be provided to indicate when an amount has been subtracted from the counter greater than the amount which has been registered. If no special mechanism were provided to take care of this, as soon as the counter wheels had passed the zero positions on the reverse movement they would indicate a high number which would be misleading as it would not indicate the amount registered. I have, therefore, provided a supplemental counter wheel which I have arranged adjacent to the tens counter wheel 11, and on which the numerals may be colored or otherwise changed to distinguish them from the numerals on the main counter. This counter wheel is so arranged that the numeral bearing portion thereof extends over the numeral bearing portion of the tens counter wheel and is provided with an opening, which when the supplemental counter wheel is in its zero or idle position, will be arranged adjacent to the sight opening 29 and will expose the adjacent numeral on the tens counter wheel. In the present type of device, in which the numerals are on the peripheries of the wheels, the supplemental wheel is in the form of a disk, as shown at 41, and is provided with a laterally extending flange 42 forming the numeral bearing portion thereof and extending across the periphery of the tens counter wheel 11. This flange has that portion which would ordinarily bear one of the zero marks cut away, as indicated at 43, to expose the adjacent portion of the tens counter wheel. The supplemental counter wheel 41 is loosely mounted on the shaft 10 and is normally held against movement by a spring-actuated detent and alining pawl 44, the V-shaped nose of which enters a V-shaped notch 45 in a disk 46, which disk is rigidly secured to and forms a part of the supplemental counter wheel. Rotatably mounted on the shaft 10 alongside of the supplemental counter wheel is a disk or rotary supporting member 47 rigidly connected with the tens counter 11 by means of a sleeve 48. Pivotally mounted on the inner side of this disk is a dog 49 having on one side thereof a pin 50 adapted to enter a notch 51 in the disk 46 carried by the supplemental counter and thus connect the tens counter wheel with the supplemental counter wheel so that movement imparted to the former will be transmitted to the latter and the two will be caused to rotate in unison. A spring 52 holds the dog normally in its retracted position with the pin out of the notch and prevents the connection of the two counter wheels. Means are provided controlled by the position of the dollars counter wheel to positively move the pin of the dog 49 into the notch in the supplemental counter wheel, thus establishing the connection and causing the two counter wheels to rotate in unison. As here shown the dog has a nose 53 and pivotally mounted adjacent to the disk 47 is a finger 54 which is normally held away from the disk by means of a spring 55 but is adapted to be moved into the path of the nose 53 of the dog and to engage this nose and force the dog inward to cause the pin to enter the notch. This movement is imparted to the finger 54 by an arm 56 rigidly connected therewith and having an inclined portion 57 arranged to be engaged by a pin 58, carried by the star wheel 14 of the dollars counter wheel, and rocked about its axis to move the arm 54 into the path of the nose on the dog 49. When the dog has been moved into its operative position a spring-pressed pawl 59 engages the end of the dog and retains the same in its operative position. If the counters continue to move in a reverse direction the dollars counter wheel will be actuated and the pin moved away from the arm 56 before the dog again reaches the finger 54. On the other hand, if the counters are moved in a forward direction to carry them back to zero the finger 54 will engage the pawl 59 and will move the same outward against the pressure of its spring and thus disengage it from the dog and permit the latter to move into an inoperative position to again disconnect the two counter wheels and allow the supplemental counter wheel to remain idle while the tens counter wheel continues its movement. Thus it will be noted that the dog 49, disk 46 and their coöperating devices constitute actuating means for the supplement counter wheel, which actuating means are normally disconnected and inoperative but may be operatively connected by the action of the finger 54, which, in turn, is actuated by the dollars counter wheel through the medium of the arm 56.

The shaft 10, upon which the counters are mounted, preferably extends the full length of the registering mechanism and carries the counters for the several registering units and constitutes a resetting shaft. This shaft is provided with a longitudinal notch 60 extending lengthwise thereof and mounted upon each counter, preferably upon the star wheel forming a part of that counter, and also upon the disk 47, is a spring-pressed dog 61 so arranged that when the counters are operated in a normal direction the end of the dog will ride over the surface of the shaft. Mounted at one side of the shaft 10 are a series of cams 62, one for each dog 61. When the shaft 10 is rotated in a forward direction the notch 60 will pick up the several dogs and will rotate the several counter wheels to bring them back to their zero position, at which position the movement of the shaft is checked by a spring-pressed dog 63 mounted near one end of the shaft. When the counter wheels are rotated in a reverse direction the outer ends of the dogs are caused to engage the inner ends of the corresponding cams 62 and move the dogs outward to permit them to clear the notch in the shaft, thus preventing the notch from locking the counter wheels against rearward movement.

In Figs. 10, 11 and 12 I have illustrated a modified form of resetting mechanism. In this form of device the shaft 10 is provided with a longitudinal groove 65 and with a series of circumferential grooves 66, there being one of these circumferential grooves adjacent to each of the counter wheels. Mounted upon each counter wheel is a pawl 67, the nose of which extends into the adjacent circumferential groove 66. Mounted in the longitudinal groove 65 is a slidable key 68 having transverse notches 69 corresponding to the circumferential grooves in the shaft. Normally these notches are in alinement with the grooves and the counters may rotate in either direction uninterruptedly. When it is desired to reset the counters to zero lengthwise movement is imparted to the key 68 to move the notches out of alinement with the circumferential grooves in the shaft, thus causing the key to form an abutment in each groove which will engage the pawl when rotary movement is imparted to the shaft and rotate the counter wheels to their zero positions, the movement of the shaft being checked at that point in the same manner as before. In case a counter wheel should be in such a position that the end of the pawl would lie across the key, when it is desired to impart lengthwise movement thereto, I have cut away or beveled one edge of the notch in the shaft so that it will engage beneath the pawl and lift the same, thus permitting the longitudinal movement of the key without interfering with the position of the counter wheel.

The operation of the mechanism has been described in connection with the description of the several parts thereof and I wish it to be understood that while I have shown and described one embodiment of my invention this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. In a computing device, a casing having a sight opening, a counter wheel visible through said sight opening, means to move said counter wheel in either direction to add to or subtract from the amount registered thereon, and means coöperating with said counter wheel to indicate when the registration is less than zero, all of said registrations being visible through said sight opening.

2. In a computing device, a casing having a sight opening, a counter wheel, means to move said counter wheel in either direction, to add to or subtract from the amount registered thereon, and a supplemental counter wheel to indicate the amount registered when this is less than zero, said sight opening serving to expose both said counter wheel and said supplemental counter wheel.

3. In a computing device, a counter wheel, means to move said counter wheel in either direction to add to or subtract from the amount registered thereon, a supplemental counter wheel having its numeral bearing surface arranged in front of the numeral bearing surface of the first-mentioned counter wheel and having a portion of said surface cut away to expose the adjacent numeral on the first-mentioned counter wheel, and means to move said supplemental counter wheel when the count is below zero.

4. In a computing device, a counter wheel, means to move said counter wheel in either direction, to add to or subtract from the amount registered theron, a supplemental counter wheel arranged adjacent to the first-mentioned counter wheel and having a peripheral flange extending across the periphery of said first-mentioned counter wheel, said flange being of a circumferential length less than the circumference of said supplemental counter wheel, and means to cause said counter wheels to move in unison or to cause one of said counter wheels to move independently of the other.

5. In a computing device, a counter wheel, means to move said counter wheel in either direction, to add to or subtract from the amount registered thereon, a supplemental counter wheel arranged adjacent to the first-mentioned counter wheel and having a peripheral flange extending across the periphery of said first-mentioned counter wheel, said flange being of a circumferential length less than the circumference of said supplemental counter wheel; and means to automatically establish a connection between said first-mentioned counter wheel and said supplemental counter wheel.

6. In a computing device, a counter wheel, means to move said counter wheel in either direction, to add to or subtract from the amount registered thereon, a supplemental counter wheel arranged adjacent to the first-mentioned counter wheel and having a peripheral flange extending across the periphery of said first-mentioned counter wheel, said flange being of a circumferential length less than the circumference of said supplemental counter wheel, and means controlled by said first-mentioned counter wheel to establish a connection between the two counter wheels when the registration on the first-mentioned counter wheel is less than zero.

7. In a computing device, a counter wheel, means to move said counter wheel in either direction, to add to or subtract from the amount registered thereon, a supplemental counter wheel arranged adjacent to the first-mentioned counter wheel and having a peripheral flange extending across the periphery of said first-mentioned counter wheel, said flange being of a circumferential length less than the circumference of said supplemental counter wheel, a connecting device connected to and rotating with said first-mentioned counter wheel and adapted to operatively connect the same with said supplemental counter wheel, and means to automatically actuate said connecting device to establish said connection or interrupt the same.

8. In a computing device, a counter wheel, means to move said counter wheel in either direction, to add to or subtract from the amount registered thereon, a supplemental counter wheel arranged adjacent to the first-mentioned counter wheel and having a peripheral flange extending across the periphery of said first-mentioned counter wheel, said flange being of a circumferential length less than the circumference of said supplemental counter wheel, a disk rotatably mounted adjacent to said supplemental counter wheel and connected to and rotatable with the first-mentioned counter wheel, a connecting device carried by said disk and adapted to be moved into and out of operative relation to said supplemental counter wheel, and automatic means to move said connecting device into and out of its operative position.

9. In a computing device, a counter comprising a cents counter wheel and a dollars counter wheel, means to actuate said counter wheels in both directions, to add to or subtract from the amount registered thereon, a supplemental counter wheel comprising a peripheral flange extending across the periphery of the cents counter wheel, said flange being of less length than the circumference of said supplemental counter wheel, a connecting device connected to said cents counter wheel, rotatable therewith and movable into and out of operative relation to said supplemental counter wheel, and means controlled by the position of said dollars counter wheel to move said connecting device into or out of its operative position.

10. In a computing device, a counter comprising a cents counter wheel and a dollars counter wheel, means to actuate said counter wheels in both directions, to add to or subtract from the amount registered thereon, a supplemental counter wheel comprising a peripheral flange extending across the periphery of the cents counter wheel, said flange being of less length than the circumference of said supplemental counter wheel, a connecting device connected to said cents counter wheel, rotatable therewith and movable into and out of operative relation to said supplemental counter wheel, a trip device mounted adjacent to said connecting device and adapted to be moved into and out of the path thereof, and means controlled by the position of said dollars counter wheel to move said trip device from one position to another.

11. In a computing device, a counter comprising a cents counter wheel and a dollars counter wheel, means to actuate said counter wheels in both directions, to add to or subtract from the amount registered thereon, a supplemental counter wheel comprising a peripheral flange extending across the periphery of the cents counter wheel, said flange being of less length than the circumference of said supplemental counter wheel, a disk mounted adjacent to said supplemental counter wheel and connected with said cents counter wheel, a connecting member pivotally mounted thereon and adapted to be moved into and out of operative relation to said supplemental counter wheel, said connecting device having a projection, a trip device pivotally mounted adjacent to said disk and held normally out of the path of said projection, an arm connected with said trip device, and a pin carried by said dollars counter wheel and adapted to engage said arm and move said trip device into the path of said projection when said dollars wheel is in its zero position.

12. In a computing device, a counter comprising a cents counter wheel and a dollars counter wheel, means to actuate said counter wheels in both directions, to add to or subtract from the amount registered thereon, a supplemental counter wheel comprising a peripheral flange extending across the periphery of the cents counter wheel, said flange being of less length than the circumference of said supplemental counter wheel, a disk mounted adjacent to said supplemental counter wheel and connected to and rotating with said cents counter wheel, a spring-pressed pawl pivotally mounted on said disk and having a part to operatively engage said supplemental counter wheel but held normally out of engagement therewith, a trip device arranged adjacent to said disk and adapted to engage said pawl to move the same into operative engagement with said supplemental counter wheel, and a dog carried by said disk to engage said pawl and hold it in operative engagement.

13. In a computing device, a counter comprising a cents counter wheel and a dollars counter wheel, means to actuate said counter wheels in both directions, to add to or subtract from the amount registered thereon, a supplemental counter wheel comprising a peripheral flange extending across the periphery of the cents counter wheel, said flange being of less length than the circumference of said supplemental counter wheel, a disk mounted adjacent to said supplemental counter wheel and connected to and rotating with said cents counter wheel, a spring-pressed pawl pivotally mounted on said disk and having a part to operatively engage said supplemental counter wheel but held normally out of engagement therewith, and a trip device adapted to engage said pawl to move the same into or out of operative engagement with said supplemental counter wheel.

14. In a computing device, a counter comprising a cents counter wheel and a dollars counter wheel, means to actuate said counter wheels in both directions, to add to or subtract from the amount registered thereon, a supplemental counter wheel comprising a peripheral flange extending across the periphery of the cents counter wheel, said flange being of less length than the circumference of said supplemental counter wheel, a disk mounted adjacent to said supplemental counter wheel and connected to and rotating with said cents counter wheel, a spring-pressed pawl pivotally mounted on said disk and having a part to operatively engage said supplemental counter wheel but held normally out of engagement therewith, a trip device adapted to engage said pawl to move the same into or out of operative engagement with said supplemental counter wheel, and means controlled by the position of said dollars counter wheel to move said trip device into and out of operative relation to said pawl.

15. In a computing device, a cents counter wheel, a dollar counter wheel, means to move said counter wheels in either direction, a supplemental counter wheel having its numeral bearing portion arranged in front of the numeral bearing portion of said cents counter wheel and having an opening to expose one of the numerals on said cents counter wheel, means for holding said supplemental counter wheel normally against rotation, and means controlled by the position of said dollars counter wheel for connecting said supplemental counter wheel with said cents counter wheel.

16. In a computing device, a cents counter wheel, a dollar counter wheel, means to move said counter wheels in either direction, a supplemental counter wheel having its numeral bearing portion arranged in front of the numeral bearing portion of said cents counter wheel and having an opening to expose one of the numerals on said cents counter wheel, means for holding said supplemental counter wheel normally against rotation, a connecting device secured to and rotating with said cents counter wheel and movable into and out of operative relation to said supplemental counter wheel, a trip device to engage said connecting device and move the same into or out of such operative engagement, and means controlled by the position of said dollars counter wheel to move said trip device into an operative position.

17. In a computing device, two counter wheels, means to move said counter wheels in either direction, a supplemental wheel having its numeral bearing portion in front of the numeral bearing portion of one of said counter wheels and having an opening to expose one of the numerals on said counter wheel, said supplemental counter wheel being normally held against rotation, and means controlled by the other of said counter wheels to cause the operation of said supplemental counter wheel.

18. In a computing device, two counter wheels, means to move said counter wheels in either direction, a supplemental counter wheel having its numeral bearing portion arranged in front of the numeral bearing portion of one of said counter wheels and having an opening to expose one of the numerals on said counter wheel, means to cause the operation of said supplemental counter wheel, said means being normally inoperative, and means controlled by the other of said counter wheels to render the first-mentioned means operative.

19. In a computing device, two counter wheels, means to move said counter wheels in either direction, a supplemental counter wheel having its numeral bearing portion arranged in front of the numeral bearing portion of one of said counter wheels and having an opening to expose one of the numerals on said counter wheel, an actuating device to impart movement to said supplemental counter wheel, said actuating device being normally disconnected from said supplemental counter wheel, and means controlled by the other of said counter wheels to establish an operative connection between said actuating device and said supplemental counter wheel.

20. In a computing device, two counter wheels, means to move said counter wheels in either direction, a supplemental counter wheel having its numeral bearing portion arranged in front of the numeral bearing portion of one of said counter wheels and having an opening to expose one of the numerals on said counter wheel, an actuating device to impart movement to said supplemental counter wheel, said actuating device being normally disconnected from said supplemental counter wheel, a finger arranged to establish an operative connection between said supplemental counter wheel and said actuating device, and an arm arranged to be actuated by the other of said counter wheels to operatively connect it with said finger.

21. In a computing device, a counter wheel, means to move said counter wheel in either direction to add to or subtract from the amount registered thereon, a supplemental counter wheel arranged adjacent to the first-mentioned counter wheel and having its numeral bearing portion extending in front of the numeral bearing portion of the first-mentioned counter wheel and having an opening to expose a section of the numeral bearing portion of said first-mentioned counter wheel, and means to automatically cause the operation of said supplemental counter wheel when the count on said first-mentioned counter wheel is reduced below zero.

22. In a device of the character described, a casing having a sight opening, a coin receptacle having an inlet and an outlet, a counter wheel arranged within said casing to be visible through said sight opening and mounted for movement in either direction, counter actuating devices comprising a part arranged in the path of the coin as it passes through said inlet to actuate the counter wheel in one direction and also comprising a part extending into the path of the coin as it passes through said outlet to actuate said counter wheel in the opposite direction, whereby the operation of said counter wheel will be directly controlled by the coins and the amount readable through said sight opening will represent the difference between the coins received and the coins discharged from said receptacle, and means coöperating with said counter wheel to indicate when more coins have been discharged during a given time than have been received during that time.

23. In a device of the character described, a casing having a sight opening, a coin receptacle having an inlet and an outlet, a counter wheel arranged within said casing, visible through said sight opening and mounted for movement in either direction, an actuating device mounted on one side of said counter wheel and comprising a part extending into the path of the coin as it passes through said inlet, to cause the operation of said counter wheel in one direction, a separate actuating device mounted on the other side of said counter wheel and comprising a part extending into the path of the coin as it passes through said outlet to cause the operation of said counter wheel in the opposite direction, whereby the amount readable through said sight opening will be directly controlled by the coins and will indicate the difference between the coins received and the coins discharged from said receptacle, and means coöperating with said counter wheel to indicate when more coins have been discharged during a given time than have been received during that time.

24. In a device of the character described, registering mechanism comprising two counter wheels, separate driving members connected with said counter wheels, actuating devices coöperating with the two driving members to actuate the respective counter wheels, an operable member on which both actuating devices are supported, operating mechanism for said member, means for retaining the actuating device for one of said counter wheels normally in inoperative relation to its coöperative driving member, said actuating device and the other of said counter wheels having parts arranged to coöperate, when said counter wheel is in predetermined position, to move the actuating device for the first-mentioned counter wheel into operative relation to its coöperating driving member, whereby the operation of said supporting member will cause both counter wheels to be simultaneously actuated by the respective actuating devices.

25. In a device of the character described, two counter wheels arranged adjacent one to the other to rotate about a common axis, a driving wheel secured to each counter wheel, actuating pawls for the respective driving wheels, an operable supporting member on which said actuating pawls are mounted, means to hold one of said pawls normally in an inoperative position, means to operate said supporting member to move the two pawls in unison toward and away from the respective driving wheels, and means controlled by the position of the counter wheel whose actuating pawl is normally in operative position to cause the pawl of the other counter wheel to be moved into operative position to actuate the other counter wheel.

26. In a device of the character described, two counter wheels arranged adjacent one to the other to rotate about a common axis, a driving wheel carried by each counter wheel, actuating pawls for said driving wheels, a spring to hold one of said pawls normally in an inoperative position, means to move the two pawls in unison toward and away from the respective driving wheels, a stop carried by that counter wheel whose pawl is normally in operative position, a spring-pressed finger movable with said pawls and adapted to engage said stop when the counter carrying the same has been moved into a predetermined position and means actuated by said finger to cause the pawl for the other counter wheel to be moved into an inoperative position.

27. In a device of the character described, two counter wheels each having a driving wheel secured thereto, an arm having movement toward and away from said counter wheels, two pawls pivotally mounted on said arm to actuate the respective driving wheels, and means to hold one of said pawls normally in an inoperative position, a finger connected with said inoperative pawl and supported adjacent to the other pawl, and a stop carried by that counter wheel whose pawl is normally in an operative position, and arranged to be engaged by said finger when said counter wheel is in a predetermined position to move the pawl for the other counter wheel into an operative position.

28. In a device of the character described, a shaft having a longitudinal notch, a plurality of counter wheels rotatably mounted on said shaft, a pawl connected with each of said counter wheels and adapted to ride over the periphery of said shaft when its counter wheel is rotated in one direction, and a fixed cam to engage said pawl and move it away from said shaft to permit it to pass said notch when said counter wheel is moved in the opposite direction.

29. In a device of the character described, a shaft having a longitudinal notch therein, a counter wheel rotatably mounted on said shaft, a star wheel secured to said counter wheel, actuating pawls arranged to engage said star wheel to move said counter wheel in opposite directions, and means coöperating with said shaft to cause said counter wheel to rotate with said shaft when the latter is rotated in one direction and to permit said counter wheel to be rotated in either direction.

30. In a device of the character described, a counter wheel having a star wheel secured thereto, pawls coöperating with said star wheel to rotate the counter wheel in opposite directions, a shaft supporting said counter wheel, a pawl carried by said counter wheel and adapted to move about said shaft to permit said counter wheel to be rotated in either direction, said shaft having a part adapted to engage said pawl to reset said counter wheel when said shaft is rotated in one direction.

31. In a device of the character described, a shaft having a longitudinal notch and a circumferential groove, a counter wheel mounted on said shaft adjacent to said groove, a pawl connected with said counter wheel and having its nose extending into said circumferential groove, a key slidably mounted in said longitudinal notch and having a notch adapted to be moved into and out of registration with said circumferential groove, said key being beveled adjacent to one edge of the notch therein.

32. In a device of the character described, the combination with a coin receptacle having a coin slot in one end thereof, and a discharge opening in the other end thereof, and a plunger arranged adjacent to said discharge opening to move a coin through the same, of a registering mechanism comprising a dollars counter wheel and a cents counter wheel, each of said counter wheels having a star wheel secured thereto, a rock arm mounted on each side of said counter wheels, pawls carried by the respective rock arms to engage the respective star wheels, a second arm secured to one of said rock arms and extending into the inlet for said coin receptacle in the path of the coins entering the same, and an arm connected with the other of said rock arms and extending into the discharge opening of said coin receptacle in the path of the coin being discharged therefrom.

In testimony whereof, I affix my signature in presence of two witnesses.

CHARLES WM. RIPSCH.

Witnesses:
F. W. SCHAEFER,
EDWARD A. REED.